March 4, 1952  I. EDELMAN  2,588,221
AUTOMATIC TOASTER
Filed Oct. 16, 1948  4 Sheets-Sheet 1

INVENTOR.
IRVING EDELMAN
BY
ATTORNEY

March 4, 1952     I. EDELMAN     2,588,221
AUTOMATIC TOASTER
Filed Oct. 16, 1948     4 Sheets-Sheet 2

IRVING EDELMAN
INVENTOR.

BY

ATTORNEY

March 4, 1952 — I. EDELMAN — 2,588,221
AUTOMATIC TOASTER
Filed Oct. 16, 1948 — 4 Sheets-Sheet 3
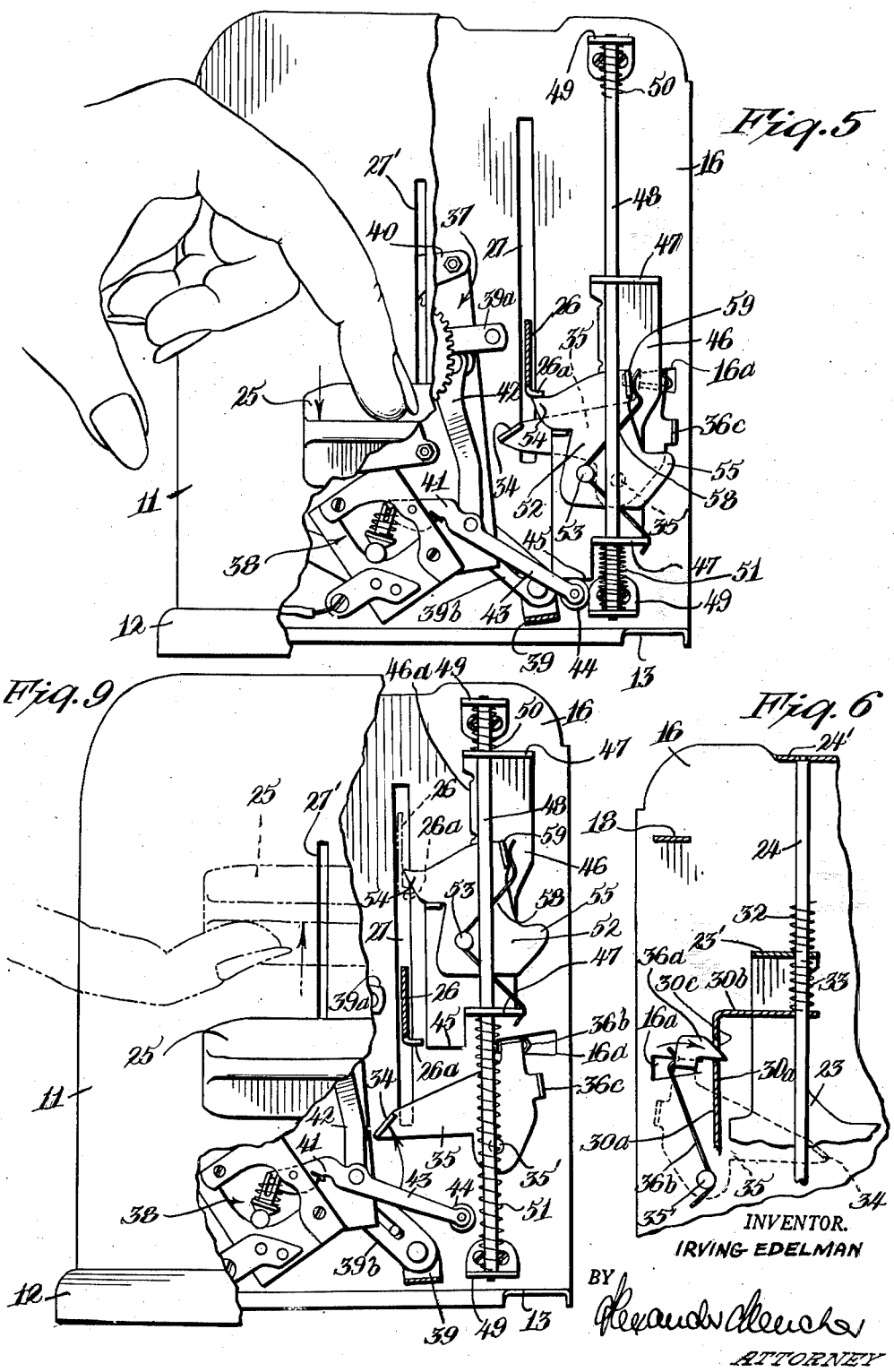
INVENTOR.
IRVING EDELMAN
BY
ATTORNEY March 4, 1952     I. EDELMAN     2,588,221
AUTOMATIC TOASTER
Filed Oct. 16, 1948     4 Sheets-Sheet 4
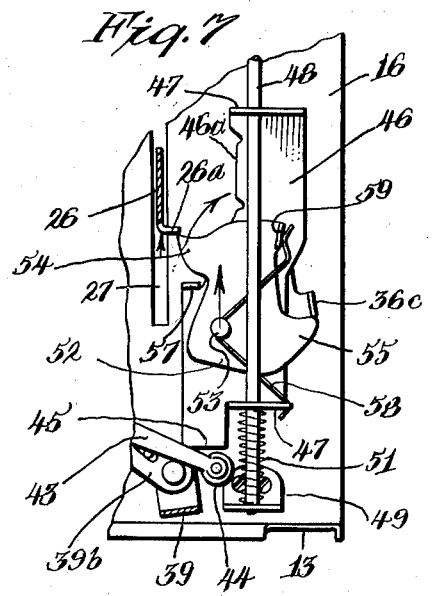
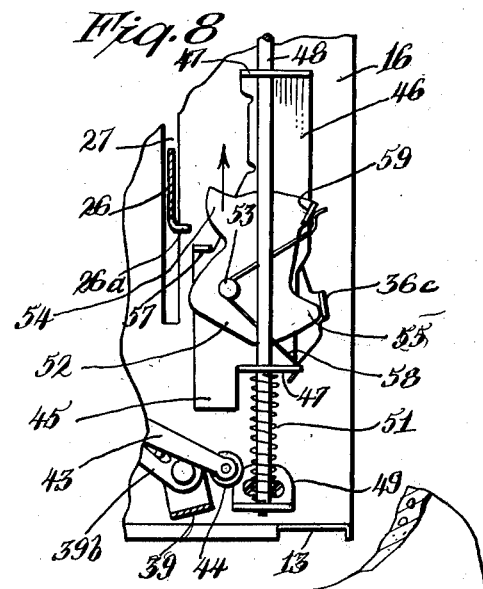
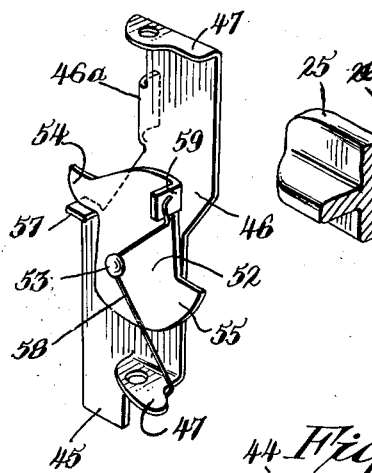
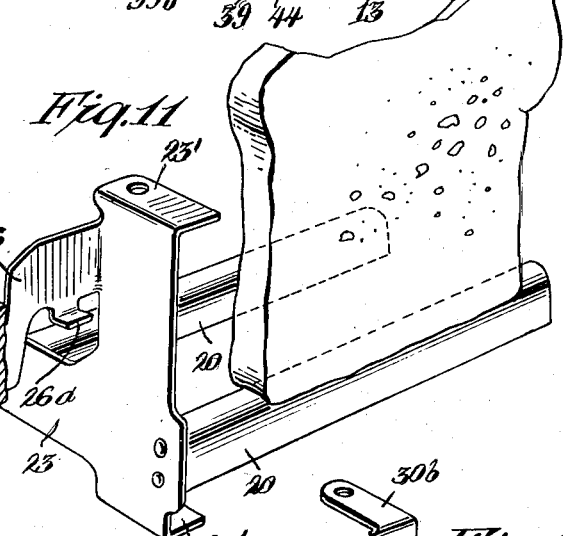
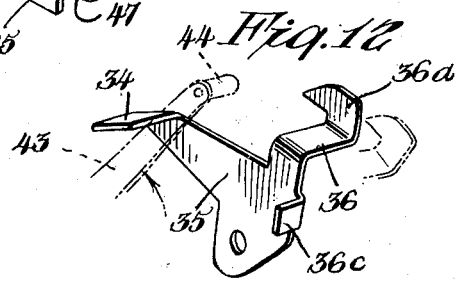
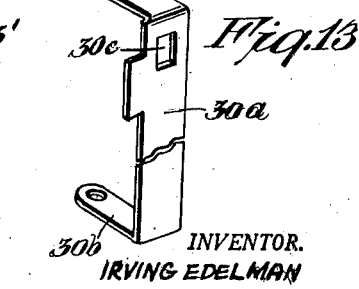
INVENTOR.
IRVING EDELMAN
BY
ATTORNEY Patented Mar. 4, 1952

2,588,221

UNITED STATES PATENT OFFICE 2,588,221

AUTOMATIC TOASTER

Irving Edelman, Brooklyn, N. Y.

Application October 16, 1948, Serial No. 54,969

2 Claims. (Cl. 99—327)

This invention relates to automatic toasters and the like.

One object of the invention is to provide an automatic toaster embodying a timing and automatic switch mechanism having novel means whereby the toast may be inspected at any time without resetting or interfering with the timing and switch mechanism.

A further object of the invention is to provide in toasters of the above indicated type, improved means whereby the carrier may be raised at any time during the toasting period to permit the inspection of the toast without interfering with the timing and the automatic switch mechanism.

Another object is to provide a toaster of the above type whereby upon the completion of a toasting period the carrier will be automatically raised or ejected without subjecting the mechanism to undue shock.

A further object of the invention is to provide a toaster wherein substantially all of the parts may be readily stamped and formed from sheet metal and are constructed to permit quick assembly, and when assembled, to provide a toaster which is dependable and accurate in operation.

A further object of the invention resides in the provision of a vertically guided and biased setting member having a trippable part in the path of a common vertically guided starting and toast inspecting manually operated device, said trippable part on the initiation of the return movement of the setting member clearing said device and returning to its original position and being adapted to be out of the path of the said device or lever when the latter is lifted for toast inspection during the toasting period so that the setting of the mechanism is not interfered with. Cooperating with and in furtherance of this object is the engagement by the toast rack at a limited uppermost position with a locked elevator during the toasting period so that the device at uppermost toast inspecting position is below said trippable part.

These objects and other incidental ends and advantages of the invention will hereinafter appear in the progress of the disclosure and as pointed out in the appended claims.

Accompanying this specification are drawings showing the preferred embodiment of the invention wherein:

Figure 5 is a side view partly cut away and partly in section showing the force limiting downward position of the setting member for the toasting operation before finger release of the common manually operable starting and toast inspecting member.

Figure 6 is a fragmentary side view similar to Figure 4 showing the elevator of Figure 4 in locked and restrained position when the starting and toast inspection member is in the forced and downwardly limiting position shown in Figure 5.

Figure 7 is a fragmentary view partly in section showing the instantaneous position of the trippable part of the setting member at the instant of finger removal from the toasting and starting member and showing the operating means for effecting clearance over said starting member.

Figure 8 is a view similar to Figure 7 showing the same trippable part on initial upward movement of the setting member after release of the finger from the starting and toasting member.

Figure 2:
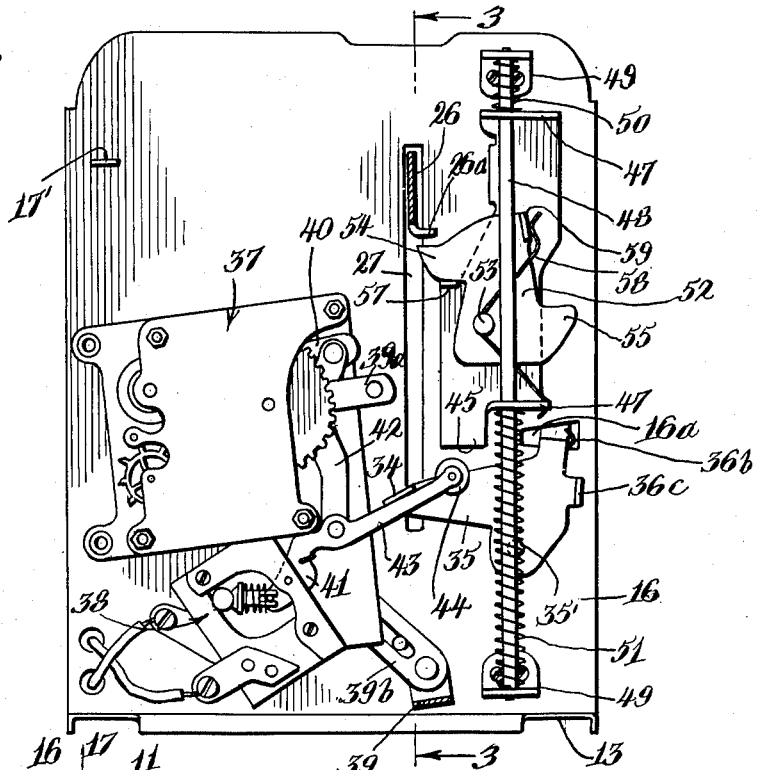
Figure 2 is a sectional view along the plane 2—2 of Figure 1.

Figure 9 is a side view partly in section showing the toasting mechanism during toasting operation, the position of the starting and toast inspecting member in its gravity-acting lowermost position and in phantom in its uppermost toast inspecting position wherein the trippable part is out of engagement with the starting member as distinguished from relative positions before the setting operation as shown in Figure 2.

Figure 10 is a view in perspective of the setting member showing the spring-biased trippable part.

Figure 11 is a fragmentary view in perspective partly in section showing the starting, toast inspecting and toast rack assembly supporting a slice of bread or toast.

Figure 12 is a fragmentary view of the locking and tripping means for the ejector or elevator, including a showing of the settable lever or operating member of the timing and switch mechanism in phantom and operable on the tripping portion after the completion of the toasting operation for release of the elevator and the popping up of the toast.

Figure 13 is a view in perspective of the elevator or ejector showing a window engageable by the locking finger shown in Figure 12 upon a setting of the timing and switch mechanism for a toasting period.

In accordance with the invention and the preferred form shown, a casing 11 is provided having openings 11a through which bread is inserted and from which toast may be lifted. The casing is generally of rectangular shape in plan, side and end views with a base support 12 therefor of suitable material, as for example wood or composition, but it is understood that the invention is applicable to other types and designs of casings and supports therefor. The toaster frame as shown comprises a base plate 13, a back vertical end plate 14, and a pair of front spaced vertical inner and outer plates 15 and 16, said plates being held together by fastening and spacing elements 17 and 18 Fig. 4. 17' shows an ear of element 17 penetrating the outer plate 16. All of these elements may be of sheet metal or other suitable material.

Between plates 14 and 15 are three spaced top and three spaced bottom cross pieces, each of the top and bottom pieces being designated by numerals 17a and 17b respectively (see Figure 3), said cross pieces carrying the electrical heating elements and also carrying the vertically disposed wires 19 which form vertically disposed chambers for the reception of the slices of toast and also form spacing and centering means for retaining the toast in spaced heating relation to the electric heaters.

Figure 1:
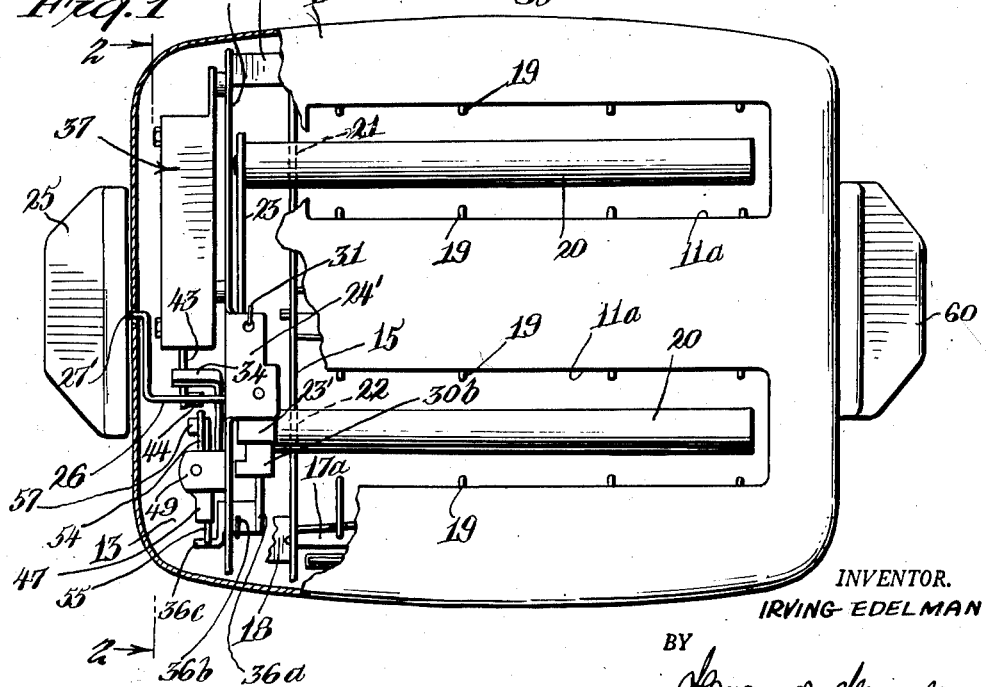
Figure 1 is a plan view partly in section of a toaster embodying the invention.

In each of the toasting chambers is disposed a rack formed from legs 20 each passing through vertical guide slots 21 and 22 formed in the end plate 15 (Figure 1), said legs being fastened at depending portions 20' (Figure 4) to a vertical guide piece 23 forming part of the starting and toasting inspection member and at right angles to form the parts 23', said parts 23' being perforated to receive a guide post 24, the latter guiding the member 23 up and down.

To the guide member 23 (see Figure 11) is fastened a manually operable starting and toast inspecting button 25 carried by an angle piece 26 formed integrally with the guide member 23, said angle piece 26 passing both through a vertical guide slot 27 formed in the end plate 13 (Figure 3) and through slot 27' in casing 11 and having a perpendicularly extending operative lug 26a to engage part of a setting member. The vertical guide post 24 may be received in any suitable manner as by means of ears 24' formed on the upper and lower edges of the end plate 13.

A spring actuated elevator or ejector 30 having a vertical guide plate 30a is disposed at right angles to the guide piece 23 and is slidable over the guide post 24 at upper and lower ends 30b turned at right angles, said ends 30b being disposed beneath the upper and lower ends 23' of guide piece 23. Ejector guide plate 30a slides along post 24, the lower end 30b being engageable with guide piece lower end 23'. An elevating or ejecting spring 31 is fastened at its lower end to the elevator lower end 30b and at its upper end to the fastening ear 24' of plate 16 and bumper springs 32 and 33 are disposed around the upper end of guide post 24 respectively between the upper ear 24' of plate 16 and the upper guide piece part 23', and between said part 23' and the upper ejector end 30b.

A tripping lug 34 operative by engagement with a part of the timing and switch mechanism after the toasting period, projects forwardly of guide slot 27 and is formed from a tripping plate member 35 pivoted at 35' to frame plate 16, said plate 35 having a rearwardly projecting elevator locking lug 36 penetrating slot 16a in plate 16, said lug 36 having a locking tooth 36a engageable with an opening 30c in the ejector or elevator guide plate 30a. Locking tooth or finger 36a is urged by a wire spring 36b to engage an opening or window 30c of the ejector or elevator guide plate 30a when the latter is moved into lowermost position, said engagement being maintained against spring 31 until the lug 34 is kicked out by the timing mechanism as will hereinafter be described. Plate 35 has a forwardly projecting edge lug 36c below lug 36 to cooperate with a trippable part of the setting member hereinafter to be described.

The timing mechanism is indicated generally at 37; the automatic switch is indicated generally at 38; and the conventional means for controlling the timing mechanism for light or dark toast is indicated at 39. Control 39 is connected to a time control lever 39a by means of linkage 39b. At 40 and 41 are indicated lever members connected by a link 42 for setting the timing mechanism and closing the switch, that is by actuating the lever 41, the timer and the switch may be set in the usual and conventional manner.

Figure 3:
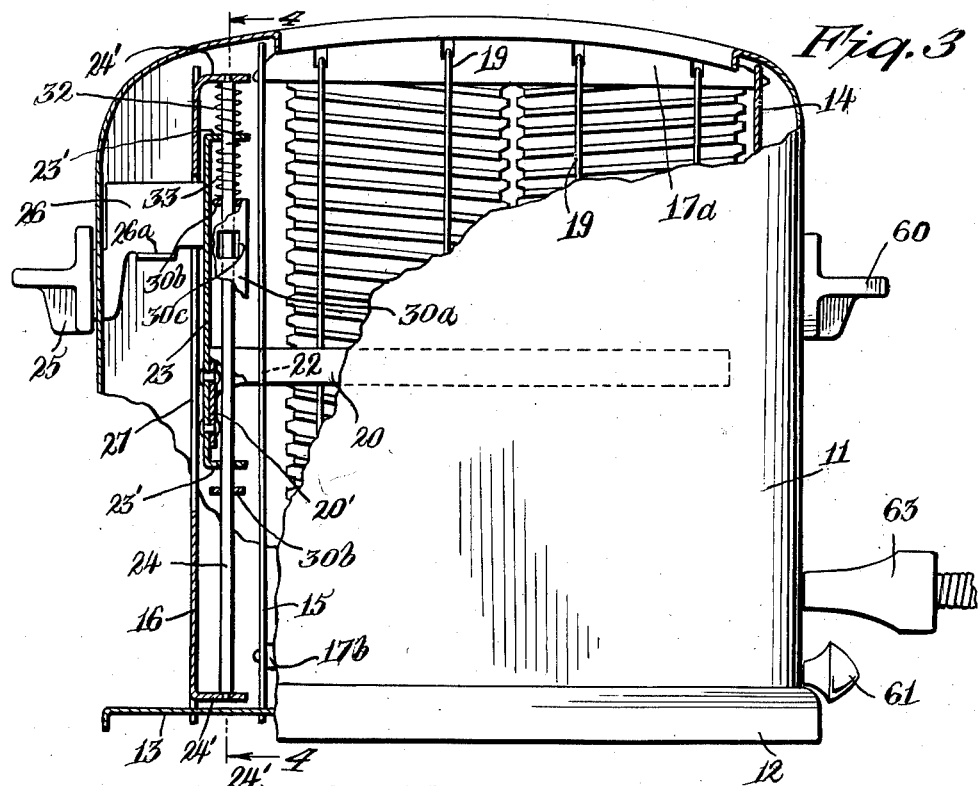
Figure 3 is a side view partly in section of the toaster.

Lever 41 of the timing and switch mechanism has extending therefrom a settable part 43 having at the end thereof a roller 44, which with the mechanism in the off position is normally disposed adjacently underneath and in the path of a downwardly extending lug 45 of a setting plate or member 46 of the setting assembly (best shown in Figures 2 and 3). Setting lug 45 is operable upon roller 44 of the settable lever 43 of the timer and is actuated by engagement of the starting lug 26a with the trippable part 54 of the setting plate 46. Setting plate 46 has a pair of perforated ears 47 to receive a guide post 48 affixed to brackets 49 on frame plate 16.

A bumper spring 50 around post 48 is affixed at one end to upper bracket 49, and abuts at the other end upper ear 47, and another spring 51 around post 48 is provided between lower ear 47 and lower bracket 49 to normally maintain the setting member 46 in the uppermost and off position. Intermediate the setting member 46 is a pawl plate 52 pivoted thereto at 53, said plate having opposite and diagonally disposed trippable parts 54 and 55. Plate 52 is normally spring urged toward the inner edge of setting member 46 to a limiting stop position by engagement of the lower wall of part 54 with a stop lug 57 projecting from setting plate 46. The said spring means as shown is indicated by a spring wire 58 engaged between pivot 53, an upper pawl plate lug 59 and the lower perforated ear 47 of setting plate 56.

Figure 4:
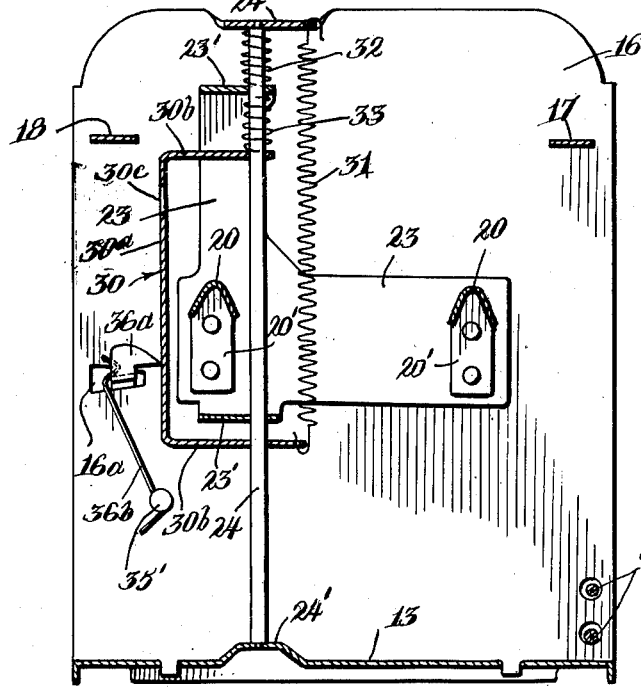
Figure 4 is a sectional view of Figure 3 across the plane 4—4 thereof showing the biased elevator in unlocked position.

A decorative setting button 60, a light and dark toast control knob 61 and plugs 62 for electrical socket 63 are shown in Figures 3 and 4. A rearwardly disposed guide lug 46a is formed on an edge of setting plate 46 to prevent rotary movement on guide post 48 and enters a slot in plate 16 not shown.

To set the timing and switch mechanism from normal and off position shown in Figure 2, the manual starting button 25 is pushed progressively downwardly with the finger. This operation initiates engagement between setting lug 45 and roller 44 of the settable lever 43 of the timer by means of the engagement of the starter lug 26a with the trippable part 54 of the plate 52.

The initial straight downward motion of starting button 25 through guide plate 23 forces ejector or elevator plate 30a downwardly against the force of ejector spring 31 and the setting member 46 downwardly against the force of setting spring 51.

Upon progression of movement of starting button 25 the lower cam face of trippable part or finger 55 rides along lug 36c urging it outwardly against the action of spring 30b until the finger 55 is freed of said lug 36c when button 25 is in lowermost position. At this time, latching finger 36a is urged into window 30c of the depressed elevator plate 30 locking the latter in place. At the same time, setting member lug 45 has forced roller 44 of the settable lever 43 to a set and timed toasting position.

Upon release of the finger from the starting and inspecting button 25, the force of setting member spring 51 causes an upward movement of setting member 46 to the original position thereof. In the progress of the upper movement of setting member 46, trippable part 55 engages stop 36c to cause a clock-wise pivoting of plate 52 whereby finger 54 is released from the starting lug 26a and brought to original and off position as shown in Figures 7, 8 and 9. The inspecting or starting button 25, carrying rack 20 is now free to move up and down within the slot 27, its uppermost position being limited by engagement between the upper ear 30b of elevator plate 30a and the rack 20 of the guide member 23, so that during toasting operation starting lug 26a is always below trippable part 54 and therefore out of its path to avoid causing a second toasting cycle during inspection. When the toasting cycle is completed, roller 44 trips the lug 34 causing disengagement between locking finger 36a and elevator plate window 30c, whereupon the plate 30a is forced upwardly by spring 31 carrying therewith rack 20 resting by gravity thereon and starting lug 26a above trippable part 54, whereupon the cycle of operation is completed. The normal limiting uppermost position of starting lug 26a is controlled by the upper end of slot 27 as shown in Figure 2.

I wish it understood that minor changes and variations in material, sizes, location, integration and assembly of parts may all be resorted to without departing from the spirit of the invention and the scope of the appended claims.

I claim:

1. In an automatic electric toaster, a toaster frame and a casing surrounding the same, said frame carrying heating elements and providing toast spaces therebetween, a rack connected to the frame for vertical adjustment relative thereto, said rack having members extending into the toast spaces to support and elevate the toast pieces and a handle projection extending outwardly through the frame and casing and by which the rack may be depressed or elevated to inspect the toast, spring ejector means also connected to the frame for vertical adjustment relative thereto and engageable upon release with the rack to elevate it, a spring biased tripping member adjustable on the frame and engageable with the spring ejector means to retain it in a depressed position, a timing mechanism disposed on the frame and having a set and actuating arm operable to release the tripping member after a predetermined time interval, a spring biased setting member to set the timing mechanism adjustable in the frame and having a portion engageable with the set and actuating arm to set the timer mechanism and a spring biased pawl adjustable on the setting member and engaged by the handle projection of the rack to cause the setting member to be depressed by the rack and said pawl engageable with the tripping member upon release of the setting member to release the pawl from the rack and permit the return of the setting member free of the rack whereby the rack is left free to be elevated for inspection of the toast.

2. In an automatic electric toaster, a toaster casing, a frame within the casing including a back end plate, a pair of front spaced vertical inner and outer plates, spacing elements retaining said plates in spaced relation with respect to each other, cross pieces carrying electrical heating elements and vertically disposed wires for guiding the slices of toast, a rack for supporting the slices of toast between the electrical heating elements, said rack including a guide piece, one of said front plates having a vertically extending slot therein, said guide piece having a lug extending through said slot in the one front end plate to be guided thereby, a button on said lug and operable by the hand of the user to depress the rack and to lower toast into the spaces between the heating elements, said frame further having two vertically extending slide posts fixed thereto, said rack guide pieces having upper and loewr inwardly bent portions slidable upon one of said posts, an ejector plate having upper and lower inwardly bent portions slidably connected to the one post and lying respectively below the upper and lower inwardly bent portions of the rack guide pieces, said ejector extending at right angles to the rack guide piece, said ejector having a locking tooth receiving opening therein, a tripping plate pivoted on the one end plate and having a locking tooth projection adapted to enter the opening in the ejector plate to hold the ejector in a downwardly forced position, an ejecting spring connected between the ejector and the frame for urging the upward movement of the ejector plate upon release of the same from the tripping plate, said ejector engaging the rack guide piece to lift the same upon release of the tripping plate locking tooth, a timing and switch mechanism disposed in the frame and having a set and actuating arm adapted to be moved upwardly by the mechanism, a setting member vertically adjustable on the other vertically extending post, a compression spring on said post urging the upward movement of said setting member, a pawl plate pivoted upon the setting member and engageable by the projection of the rack guide piece to cause the setting member to be moved downwardly when the button is depressed, stop means on the setting member for limiting the pivoted movement of the pawl member under the rack guide piece projection, spring means on the setting member urging the pawl toward the stop means, said setting member having a portion engaging the time and switch mechanism arm to move the same to the down and set position, spring means on the other post for returning upwardly the setting member when the button and rack piece are released, said tripping plate having a further projection engageable by the timing and switch mechanism arm to release the tripping plate locking tooth from the ejector, said tripping plate having a still further projection thereon, said pawl member having a projection engageable by the still further projection on the tripping plate upon the return upward movement of the setting member whereby the pawl member of the setting member will be released from the rack guide piece projection so that the setting member will be upwardly returned free of the rack guide piece and the rack made free to lift the toast for inspection.

IRVING EDELMAN.

REFERENCES CITED

The following references are of record in the file of this patent:

UNITED STATES PATENTS

| Number | Name | Date |
|---|---|---|
| 2,236,405 | Ireland | Mar. 25, 1941 |
| 2,273,917 | Young | Feb. 24, 1942 |
| 2,339,183 | Myers | Jan. 11, 1944 |
| 2,361,078 | Anderson | Oct. 24, 1944 |
| 2,402,576 | Rurpura | June 25, 1948 |